J. R. ABBOTT.
WAVE AND TIDE MOTOR.
APPLICATION FILED JULY 18, 1913.
1,098,208.
Patented May 26, 1914.
3 SHEETS—SHEET 2.
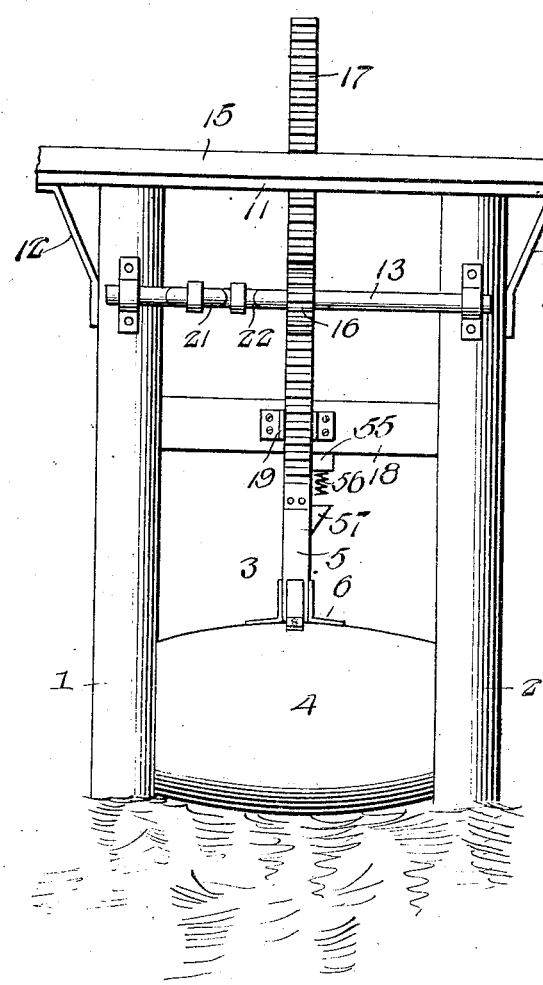
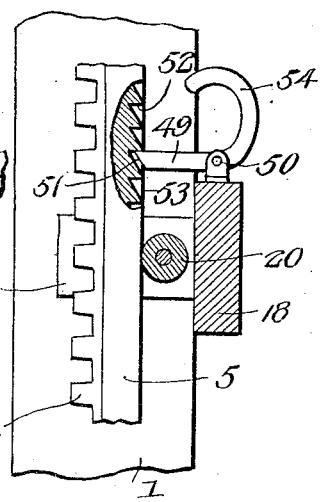
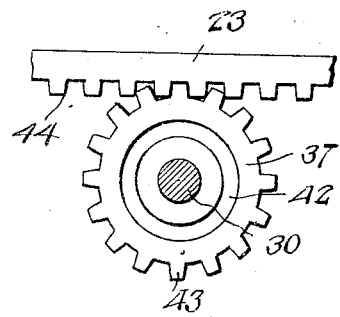
Witnesses
Hugh H. Ott
Dudley B. Howard
Inventor
James R. Abbott
By Victor J. Evans
Attorney

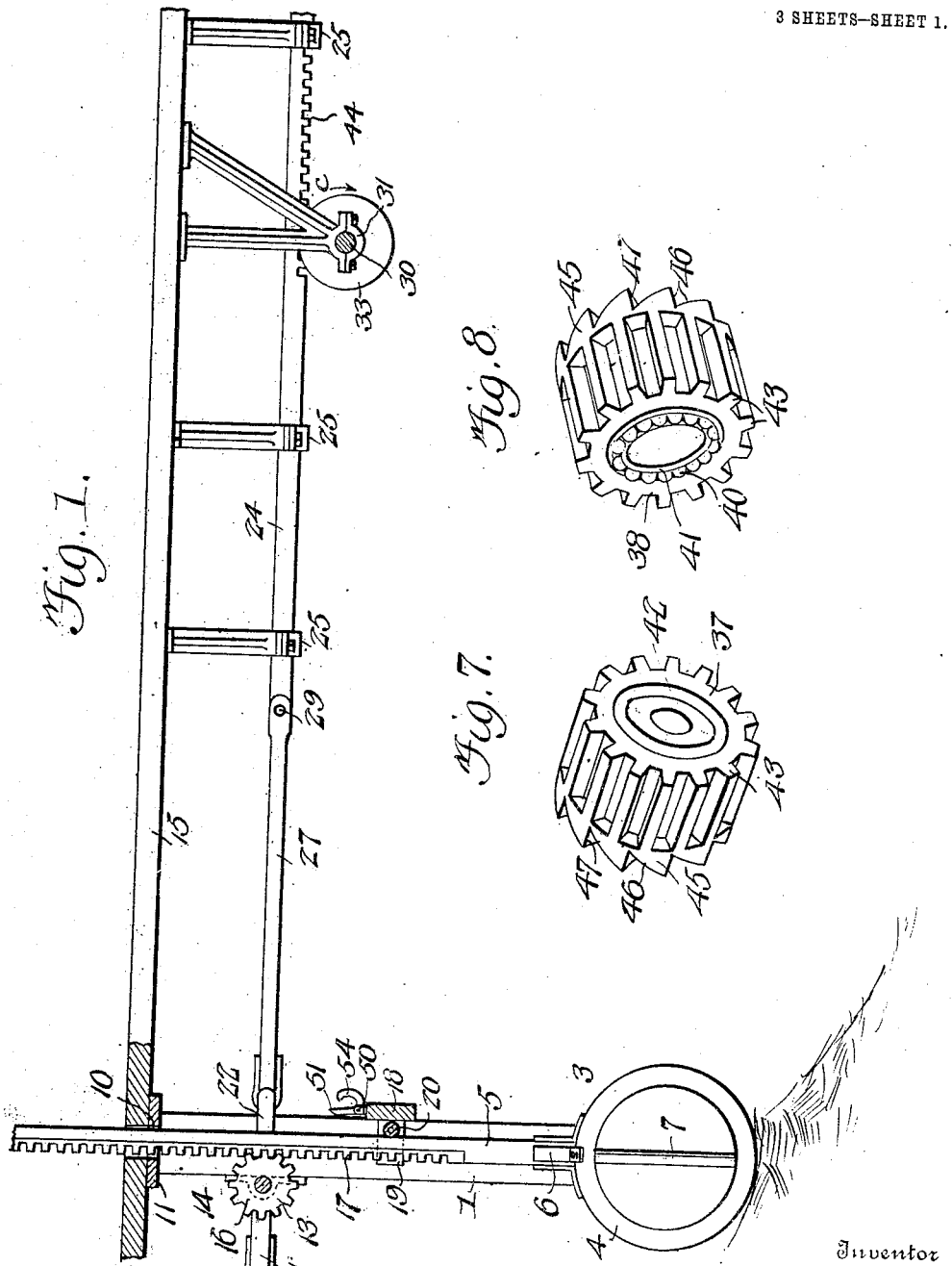

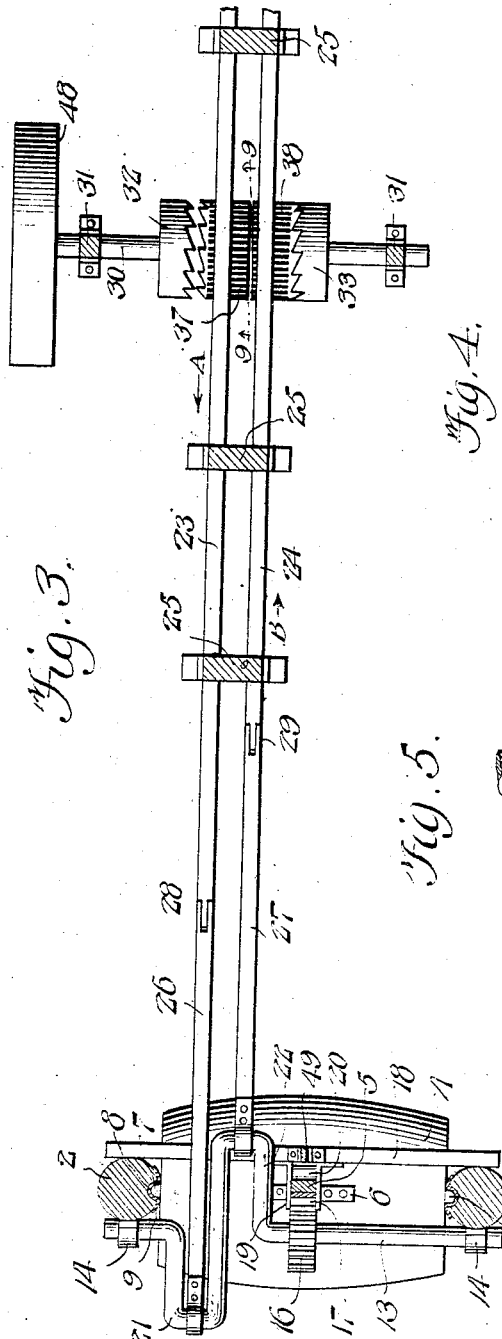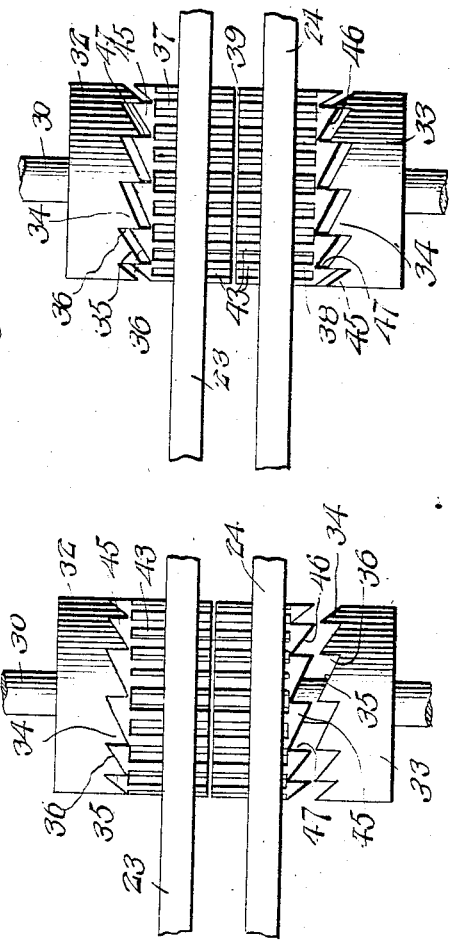

UNITED STATES PATENT OFFICE.

JAMES R. ABBOTT, OF ST. PETERSBURG, FLORIDA.

WAVE AND TIDE MOTOR.

1,098,208.  Specification of Letters Patent.  Patented May 26, 1914.

Application filed July 18, 1913. Serial No. 779,837.

*To all whom it may concern:*

Be it known that I, JAMES R. ABBOTT, a citizen of the United States, residing at St. Petersburg, in the county of Pinellas and State of Florida, have invented new and useful Improvements in Wave and Tide Motors, of which the following is a specification.

This invention relates to a wave motor and has for an object to provide a device of this character which will be very efficient in operation, which will be simple in construction and strong so as to endure heavy storms or tidal waves, and which will occupy a very small amount of space.

A further object is to provide, in a device of this class, a vertically reciprocating float which is adapted to be acted upon by the force of the waves, means for connecting the float to a power transmission device, and further means by which the float may be rendered inoperative whenever desired, and which will obviate danger of the device being destroyed or injured during a storm or tidal wave.

Another object is to provide simple and particularly efficient transmission means for causing continuous rotation of a shaft upon reciprocation of the float element.

The invention consists in the features of construction, combination and arrangement of parts, hereinafter fully described and claimed, reference being had to the accompanying drawings in which—

Figure 1 is a side elevation of the device in use; Fig. 2 is a front elevation of the same; Fig. 3 is a top plan view, showing one of the movable clutch members and the operating member therefor in operative position; Fig. 4 is a fragmentary top plan view of the power transmission mechanism showing the movable clutch members in their intermediate position while being shifted; Fig. 5 is a similar view showing the opposite movable clutch member and operating member in inoperative position; Fig. 6 is a vertical sectional view through a portion of the device, showing the means for locking the reciprocating float element in inoperative position. Fig. 7 is a detail perspective view of one of the movable clutch members; Fig. 8 is a similar view of the other movable clutch member; and, Fig. 9 is a vertical sectional view taken in line 9—9 of Fig. 3.

In the drawings, the numerals 1 and 2 designate the relatively spaced, vertical piles between which the float element 3 is mounted for vertical reciprocation. This float element includes a buoyant body 4, which is preferably barrel-shaped, and a vertically extending, operating standard 5 attached thereto as at 6. The body 4 is provided upon each side with a vertically disposed rib 7, which is slidably mounted within the groove 8 of the guide bar 9 mounted upon the inner face of the adjacent pile and longitudinally disposed with respect thereto. The vertical standard 5 is preferably rectangular in cross section and has its upper end slidably mounted with the rectangular guide opening 10 provided in a cap plate 11 secured fixedly to the upper ends of the piles 1 and 2. In order to render the connection between the plate 11 and the said piles more rigid, the braces 12 may be employed to connect the same.

A horizontally disposed, transverse operating shaft 13 is journaled in suitable bearings 14 attached to the front faces of the piles adjacent the upper ends thereof and in suitable proximity to the horizontal support 15 for the power transmission mechanism, which support is in this instance the flooring of a pier or wharf. This shaft 13 is provided centrally with a fixedly attached, toothed pinion 16 which is in mesh with a rack bar 17 secured to the outer face of the operating standard 5. In order to effectively maintain the rack bar 17 in constant engagement with the pinion 16, I have provided a transverse guide bar 18 connecting the piles 1 and 2 adjacent the shaft 13, and which is provided on its front face with a pair of relatively spaced guide plates 19, which latter are adapted to embrace the side faces of the standard 5 and have pivoted therebetween an anti-friction roller 20 for engagement with the rear face of the said standard opposite to the pinion 16.

Thus far it will be seen that I have provided a vertically reciprocating float element, which is adapted to be lifted by the force of the waves as they pass beneath the same and which is permitted to gravitate into its lowermost position after each wave has passed, and means for operatively connecting said element with a horizontal shaft, so that oscillatory movement of the latter will be caused by the reciprocation of the said element. It is now necessary to provide means for converting this oscillatory motion into a more convenient rotary movement, which object is accomplished by the mechanism which will now be described.

Upon the shaft 13 a pair of opposed cranks 21 and 22 are formed. These cranks are connected to a pair of horizontally reciprocating operating members 23 and 24, which are slidably mounted within the guides 25, by means of the connecting rods 26 and 27 respectively, which are pivotally connected to the said operating members by means of the wrist pins 28 and 29. In providing a device of this character for use in connection with heavy seas such as on an ocean pier, it will be desirable to construct the device as heavy and massive as is consistent with the work to be performed thereby. Such construction, however, may be resorted to without departing from the general scope of the invention.

A second, drive shaft 30 is journaled within suitable bearings 31 carried by the support 15, and is disposed in spaced parallel relation to the operating crank shaft 13. This shaft 30 is provided on both sides of the parallel operating members 23 and 24, which extend above the same, with fixed clutch members 32 and 33, having oppositely raking teeth 34 upon their inner side faces. Each of these teeth 34 includes a beveled thrusting face 35 and a longitudinal receptive face 36 for a purpose which will be presently described. A pair of coacting, movable clutch members 37 and 38 is mounted for rotary slidable movement upon the shaft 30 and between the fixed clutch members. The meeting ends of the members 37 and 38 are cut at right angles as at 39 and adapted for frictional engagement with each other. In order to reduce the friction between these members, a plurality of antifriction balls 40 are mounted within an annular retainer 41 upon the inner end face of one of the members and are adapted to engage within a race way 42 provided upon the adjacent face of the other member. Both clutch members are provided on their outer peripheries with the longitudinal pinion teeth 43, which are adapted for engagement with the longitudinal rack teeth 44 provided upon the under faces of the operating members 23 and 24. The movable clutch members are provided upon their outer side faces with the oppositely raking teeth 45. Each tooth 45 has a beveled receptive face 46 adapted to be engaged by the beveled thrusting face of one of the teeth on the adjacent fixed clutch member, and with a longitudinal actuating face 47 adapted for engagement with the receptive face of one of the teeth upon the said clutch member. The space between the operating members 23 and 24 is such that they will always be in engagement with their respective movable clutch members, and the distance of longitudinal play allowed the movable clutch member taken as a unit is equal to slightly more than the longitudinal width of the teeth upon one of the fixed clutch members. Thus, when one of the movable clutch members is in operative engagement with the corresponding fixed clutch member, the side teeth of the other movable clutch member will just clear the teeth upon its adjacent fixed clutch member.

In the operation of the device, as the float element is lifted by a wave, oscillatory movement, or variable rotary movement will be imparted to the operating crank shaft 13, thus causing reciprocation of the operating members 23 and 24 in opposite directions.

Upon reference to Fig. 3, and assuming that the operating members 23 and 24 are moving in the direction of the arrows A and B, respectively, it will be seen that the member 24 will cause rotation of the corresponding movable clutch member 38, and consequently the fixed clutch member 33, in the direction of the arrow c, thus causing rotation of the shaft 30 in the same direction, due to the engagement of the actuating faces 47 of the side teeth 45 upon the movable clutch member 38 with the receptive faces 36 of the teeth provided on the corresponding fixed clutch member 33. During this operation the movable clutch member 37 is being rotated in reverse direction to the clutch member 38 and is working free upon the shaft 30 with sufficient clearance from the fixed clutch member 32.

In Fig. 4, the operating members 23 and 24 are shown as moving in reverse directions as indicated by the arrows, thus causing relative rotation to the movable clutch members 37 and 38 in reverse directions. This figure shows the operating members as just starting upon their reverse movement, and the movable clutch member 38 is shown as being forced laterally due to engagement of the beveled thrusting faces of the teeth upon the fixed clutch member 33 with the beveled receptive faces of its side teeth. This lateral thrust which is imparted to the movable clutch member 38 by the fixed clutch member 33 causes the movable clutch member 37 to be thrust in the same direction so as to bring its side teeth into engagement with the teeth upon the fixed clutch member 32 as shown in Fig. 5. It will thus be seen that each of the operating members is operative during movement in one direction only, and that the movable clutch members are shifted laterally during each change in movement of the operating members, so as to cause continuous rotation of the shaft 30, upon which is mounted a fly wheel 48 which may be attached to a drive belt, or the said drive shaft may be connected in any other suitable manner with the machinery which is to be driven by the same.

It is at times desirable to render the wave motor inoperative, and is especially necessary at the time of a storm or tidal wave to cause the float element to be secured in a position wherein it will not be shaken and torn to pieces by the fury of the waves. To meet such conditions, I have provided a movable dog 49 which is adapted to be pivoted at 50 to the guide bar 18, and whose locking tooth 51 is adapted to be held by gravity in engagement with the ratchet teeth 52 provided in the rear face of the operating standard 5. These teeth 52 extend for only a portion of the width of the said standard and leave the plane bearing faces 53 at each side thereof for engagement with the antifriction roller 20 carried by the said guide bar. The dog 49 is provided with a counterbalancing arm 54 which will cause the tooth 51 to be maintained in inoperative position, after being thrown into the same by manual operation thereof. Thus, when the dog 49 is operated so as to bring its tooth 51 into engagement with the ratchet teeth 52 upon the standard 5, the float will be held suspended in its elevated position as caused by the passage of the next succeeding wave. Higher waves will merely serve to force the float to a higher elevation, wherein it will be securely retained by the locking dog. In order to prevent any destructive jarring movement of the float element when suspended at its highest limit, a block 55 of elastic material is secured to the guide bar 18 at one side of the standard 5 and a vertically disposed helical spring 56 is attached to the end thereof for engagement with a lateral lug 57 provided upon the adjacent side face of the standard. This composite buffer member will be compressed as the float element is forced into its limit position, and will thus act against the dog 49 so as to effectively prevent vertical jarring movement of the float element. When it is desired to render the device again operative, it is merely necessary to operate the fly wheel 48 in the proper direction to cause the standard 5 to be lifted sufficiently to permit the dog 49 to be oprated manually, so as to remove its locking tooth 51 from engagement with the ratchet 52 of the resilient float element.

From the foregoing description, taken in connection with the accompanying drawings, it will be apparent that I have provided a simply constructed and compact wave motor, which will be very efficient in operation, and which may be manufactured at a very small cost. This motor is also adapted, because of its construction, to withstand the severe storms, tidal waves, and like occurrences to which a device of this character is at times subjected.

What is claimed is:

1. A wave motor comprising relatively spaced vertical guides, a float element mounted for vertical reciprocation between the said guides, means operatively associated with said element for converting the reciprocating movement thereof into rotary movement, and means by which said element may be locked automatically in the highest position which it attains as caused by the action of the waves.

2. A wave motor comprising relatively spaced vertical guides, a float element mounted for vertical reciprocation between the said guides, means operatively associated with said element for converting the reciprocating movement thereof into rotary movement, means by which said element may be locked automatically in the highest position which it attains as caused by the action of the waves, and yieldable means for resisting the action of the waves as exerted in an upward direction when the piston element is in its inoperative position.

3. A wave motor comprising parallel vertical guides, a float element mounted for vertical reciprocation between said guides and including a buoyant body and a vertical operating standard attached thereto, a horizontal operating shaft rotatably mounted upon said guides, a toothed pinion fixedly attached to said shaft, a rack bar mounted upon said standard and in mesh with the said pinion, a stationary support, a drive shaft rotatably mounted upon said support, means connecting said shaft with the operating shaft to cause continuous rotary movement of the drive shaft during variable movement of the operating shaft, downwardly raking ratchet teeth provided upon said float standard, and a locking dog attached to the said guide and adapted to be moved into engagement with said ratchet teeth.

4. A wave motor comprising parallel vertical guides, a float element mounted for vertical reciprocation between said guides and including a buoyant body and a vertical operating standard attached thereto, a horizontal operating shaft rotatably mounted upon said guides, a toothed pinion fixedly attached to said shaft, a rack bar mounted upon said standard and in mesh with the said pinion, a stationary support, a drive shaft rotatably mounted upon said support, means connecting said shaft with the operating shaft to cause continuous rotary movement of the drive shaft during variable movement of the operating shaft, downwardly raking ratchet teeth provided upon said float standard, a locking dog attached to the said guide and adapted to be moved into engagement with said ratchet teeth, a laterally engaging lug provided upon said standard, and resilient means attached to the said guides for engagement with the upper face of said lug when the float element is in elevated position.

5. A wave motor comprising a support, a vertically movable float element, a horizontal crank shaft journaled in the support, means connecting the said shaft with the float whereby oscillatory movement of the former will be caused by reciprocation of the float, the said crank shaft being constructed to provide a pair of opposed cranks, a pair of oppositely movable reciprocating bars connected operatively with the respective cranks, a toothed rack provided upon corresponding faces of both of said bars, a horizontal drive shaft rotatably mounted upon the support in parallel relation to the crank shaft, a pair of longitudinally spaced clutch members fixedly mounted upon the drive shaft, correspondingly raking teeth provided upon the adjacent faces of the said clutch members, each tooth having a radial face and a circumferentially inclined face intersecting the same at an acute angle, a pair of independently movable clutch members rotatably and slidably mounted upon the drive shaft between the fixed clutch members, the adjacent end faces of the said movable clutch members being adapted to bear against each other, correspondingly raking teeth similar to the teeth of the fixed clutch members provided upon the outer end faces of the movable clutch members, the teeth of the movable clutch members being oppositely disposed with respect to the teeth of the fixed clutch members and being engageable therewith, the teeth of one movable clutch member being adapted to clear the teeth of the adjacent fixed clutch member when the teeth of the companion clutch member are in close mesh with the teeth of the opposite fixed clutch member, the said reciprocating bars being tangentially disposed with respect to the respective movable clutch members, and gear teeth provided upon the outer periphery of each movable clutch member for engagement with the rack teeth of the corresponding bar.

In testimony whereof I affix my signature in presence of two witnesses.

JAMES R. ABBOTT.

Witnesses:
J. D. BELL,
B. J. FARMER.

Copies of this patent may be obtained for five cents each, by addressing the "Commissioner of Patents, Washington, D. C."